United States Patent
Jung

(10) Patent No.: US 11,541,929 B2
(45) Date of Patent: Jan. 3, 2023

(54) DISTURBANCE COMPENSATION STEERING CONTROL METHOD AND MOTOR DRIVEN POWER STEERING SYSTEM THEREOF

(71) Applicants: HYUNDAI MOTOR COMPANY, Seoul (KR); KIA MOTORS CORPORATION, Seoul (KR)

(72) Inventor: Dae-Suk Jung, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 359 days.

(21) Appl. No.: 16/784,943

(22) Filed: Feb. 7, 2020

(65) Prior Publication Data

US 2021/0146994 A1    May 20, 2021

(30) Foreign Application Priority Data

Nov. 19, 2019 (KR) .......................... 10-2019-0148410

(51) Int. Cl.
  *B62D 5/04* (2006.01)
  *B62D 7/22* (2006.01)
  *B62D 6/00* (2006.01)

(52) U.S. Cl.
  CPC .......... *B62D 5/0472* (2013.01); *B62D 6/008* (2013.01); *B62D 7/222* (2013.01); *B62D 5/0463* (2013.01)

(58) Field of Classification Search
  CPC ...... B62D 5/0472; B62D 5/0421; B62D 6/00; B62D 5/0481; B62D 5/046; B62D 5/0463; B62D 7/222; B62D 6/008
  See application file for complete search history.

(56) References Cited

U.S. PATENT DOCUMENTS

| 10,093,347 | B2 | 10/2018 | Kim | |
| 2016/0318546 | A1* | 11/2016 | Lee | B62D 5/0463 |
| 2017/0166240 | A1* | 6/2017 | Han | B62D 5/046 |
| 2017/0166245 | A1 | 6/2017 | Kim | |
| 2017/0183031 | A1* | 6/2017 | Ko | B62D 6/008 |
| 2018/0111642 | A1* | 4/2018 | Endo | B62D 6/008 |

FOREIGN PATENT DOCUMENTS

| JP | 2007112366 A | 5/2007 |
| JP | 2008273226 A | 11/2008 |
| KR | 20160065365 A | 6/2016 |
| KR | 20170070901 A | 6/2017 |
| WO | 2015141253 A1 | 9/2015 |

* cited by examiner

*Primary Examiner* — Behrang Badii
(74) *Attorney, Agent, or Firm* — Lempia Summerfield Katz LLC

(57) ABSTRACT

A disturbance compensation steering control method may include, when a steering controller performs, during driving, a disturbance detection in which a tire and a steering wheel become a transfer path, performing a disturbance reduction compensation control by calculating a final compensation amount for a disturbance compensation steering output transmitted to a steering motor according to a disturbance strength and a magnitude of a steering torque.

16 Claims, 4 Drawing Sheets

DISTURBANCE COMPENSATION STEERING CONTROL METHOD AND MOTOR DRIVEN POWER STEERING SYSTEM THEREOF

CROSS-REFERENCE TO RELATED APPLICATION

This application claims priority to Korean Patent Application No. 10-2019-0148410, filed on Nov. 19, 2019, which is incorporated herein by reference in its entirety.

BACKGROUND OF PRESENT DISCLOSURE

Field of Present Disclosure

Specific embodiments of the present disclosure relate to a disturbance compensation steering control. More particularly, it relates to a motor driven power steering (MDPS) system capable of enhancing disturbance robustness of a vehicle and a high-performance vehicle vulnerable to noise, vibration, and harshness (NVH) by attenuating a vibration due to disturbance generated during driving through a motor.

DESCRIPTION OF RELATED ART

Generally, a bushing mounting and a low rigidity (i.e. a rigidity reduction) connector are applied to a vehicle such that the vehicle can maintain a high damping effect against a vibration during driving.

In particular, a motor driven power steering (MDPS) system, applied to the vehicle as a steering device, provides steering assist and restoration with respect to a steering operation of a driver as an MDPS compensation logic. Thus, the system may perform power steering assistance, which assists a steering power of the driver with motor power during driving.

Thus, the vehicle maintains steering stability through the MDPS compensation logic of the MDPS system.

In particular, the MDPS compensation logic contributes to maintaining an excellent damping effect of an ordinary vehicle to which a bushing mounting and a low rigidity (i.e. a rigidity reduction) connector are applied. The MDPS compensation logic also contributes to the stability of a steering feeling provided to the driver.

However, the MDPS compensation logic provides values of steering assist and steering restoration (i.e. motor steering assist/restoration values) with respect to the steering operation of the driver. The MDPS compensation logic stays in a basic function of steering instead of controlling disturbance as a control target. Thus, the MDPS compensation logic is vulnerable to the disturbance robustness. The MDPS compensation logic should have had the function of controlling disturbance for a stable steering feeling of the driver.

In particular, a low disturbance robustness is inevitably considered as a more serious problem in a high-performance vehicle, which is more disadvantageous to the disturbance robustness as a vibration becomes smaller when compared to an ordinary vehicle.

This is because a high gear ratio steering, a high grip tire, and a high rigidity suspension/steering mounting/setting are applied to the high-performance vehicle. Consequently, when the disturbance is input, the high-performance vehicle directly delivers an impact to the steering without a damping due to the high grip tire and the high rigid suspension mounting/setting. The high gear ratio steering makes a wheel rotation amount of the steering larger even at the same displacement to amplify vibration/displacement. Here, the steering gear ratio is a gear ratio in a steering gear box, which is determined by a rotation angle of a steering wheel and a torsion angle of the tire (i.e. a wheel).

Therefore, the MDPS compensation logic requires performance improvement in which disturbance robustness is required for a stable steering feeling of a driver even in the high-performance vehicle as well as the ordinary vehicle.

SUMMARY OF PRESENT DISCLOSURE

An embodiment of the present disclosure is directed to a disturbance compensation steering control method and a motor driven power steering system. The method and the system compensate for an occurrence of disturbance during driving by operating or driving a steering motor in a direction opposite to a vibration direction. Thus, the method and the system provide a stable steering feeling to a driver. The method and the system significantly improve the disturbance robustness and the performance of noise, vibration, and harshness (NVH) in a high-performance vehicle as well as an ordinary vehicle with a high-performance tendency. The method and the system comprise calculating a final compensation amount in consideration of a vibration strength, which is decreased from a tire toward a steering wheel. The method and the system further comprise using a difference in a steering angular velocity between a motor angle sensor and a steering angle sensor.

Other objects and advantages of the present disclosure may be understood by the following description and become apparent with reference to the embodiments of the present disclosure. Also, it should be apparent to those having ordinary skill in the art to which the present disclosure pertains that the objects and advantages of the present disclosure may be realized by the means as claimed and combinations thereof.

In an embodiment, the present disclosure provides a disturbance compensation steering control method. The method includes, when a steering controller performs, during driving, a disturbance detection in which a tire and a steering wheel become a transfer path, performing a disturbance reduction compensation control by calculating a final compensation amount for a disturbance compensation steering output transmitted to a steering motor according to a disturbance strength and a magnitude of a steering torque.

In an embodiment, a motor-based steering angular velocity through the steering motor and a steering angular velocity through the steering wheel may be applied to the disturbance detection. The motor-based steering angular velocity may be calculated by matching a gain to a vehicle speed. When the steering angular velocity is smaller than a threshold and the motor-based steering angular velocity is larger than the threshold, the disturbance detection may be determined.

In an embodiment, the disturbance reduction compensation control may include determining a disturbance compensation condition according to the disturbance detection, confirming a disturbance with the disturbance compensation condition, and calculating the final compensation amount according to the disturbance strength and the magnitude of the steering torque.

In an embodiment, the determination of the disturbance compensation condition may include determining whether a vehicle driving mode is a general road driving except for a circuit mode. The determination of the disturbance compensation condition further includes when an absolute value of a steering angle according to an operation of the steering wheel is smaller than a steering angle threshold, determining whether a vehicle driving is in a straight driving state. The determination of the disturbance compensation condition further includes when an absolute value of the steering torque according to the operation of the steering wheel is smaller than a steering torque threshold, determining whether a steering intent of a driver is present. The steering angle threshold of the absolute value of the steering angle may be ±3 deg, and the steering torque threshold of the absolute value of the steering torque may be 0.5 Nm.

In an embodiment, the final compensation amount may be increased as the disturbance strength is increased and the magnitude of the steering torque is decreased. The final compensation amount may be calculated by combining the disturbance strength with the magnitude of the steering torque.

In an embodiment, the disturbance strength may be calculated as a steering angular velocity compensation amount. The steering angular velocity compensation amount may be calculated by matching a gain to a difference in an angular velocity obtained by subtracting a steering angular velocity through the steering wheel from a motor-based steering angular velocity through the steering motor. The magnitude of the steering torque may be calculated with a steering torque compensation amount. The steering torque compensation amount may be calculated by matching a gain to the steering torque.

In an embodiment, in a driving state in which the disturbance detection is not present or a calculation condition of the final compensation amount is not satisfied, the steering controller may switch to a power assist steering control. The power assist steering control may control steering sensitivity according to a high speed and a low speed with a vehicle speed compensation amount calculated by matching a gain to a vehicle speed.

In another embodiment, the present disclosure provides a motor driven power steering (MDPS) system including a steering controller configured to detect a disturbance transferred from a tire to a steering wheel during driving. The steering controller is further configured, when the disturbance is detected, to transmit a final compensation amount calculated according to a disturbance strength and a magnitude of a steering torque to a steering motor as a disturbance compensation steering output. The steering controller is further configured, when the disturbance is not detected or a calculation condition of the final compensation amount is not satisfied, to transmit a vehicle speed compensation amount to the steering motor as a motor steering output. The vehicle speed compensation amount is calculated according to a vehicle speed. The MDPS system further includes a motor angle sensor configured to detect the disturbance at the tire. The disturbance is calculated as a motor-based steering angular velocity in the steering controller. The MDPS system further includes a steering angle sensor configured to detect the disturbance at the steering wheel. The disturbance is calculated as a steering angular velocity in the steering controller, In an embodiment, the steering controller may apply a gain-vehicle speed graph to a calculation of the vehicle speed compensation amount. The steering controller may also apply an angular velocity difference graph between the gain-motor-based steering angular velocity and the steering angular velocity and a gain-steering torque graph to the calculation of the final compensation amount.

DESCRIPTION OF SPECIFIC EMBODIMENTS

The specific embodiments of the present disclosure are described in detail below with reference to the accompanying drawings. These embodiments are examples of the present disclosure and may be implemented in various different forms by those having ordinary skill in the art to which the present disclosure pertains. Thus, the present disclosure is not limited to these embodiments.

Figure 1:
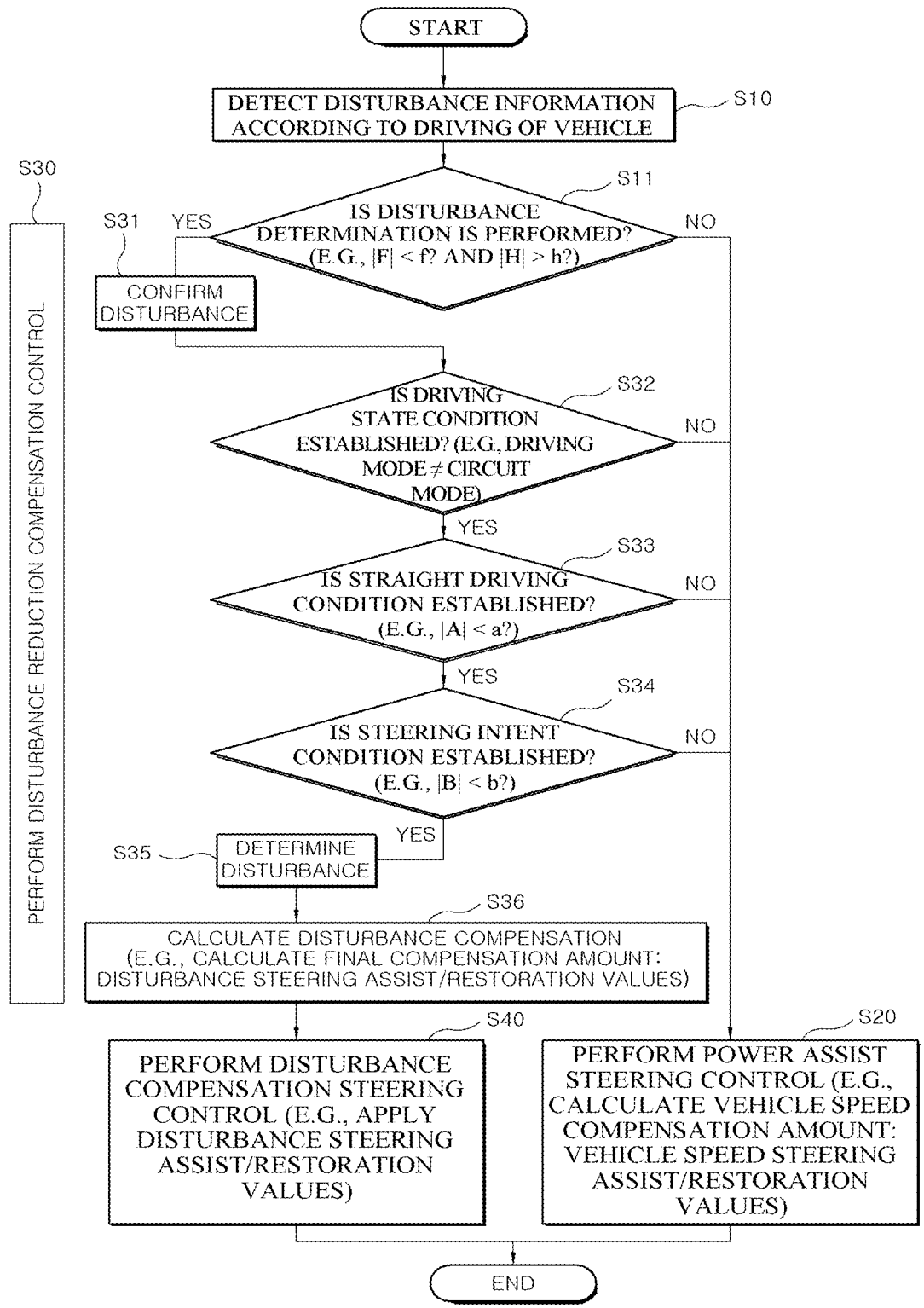
FIG. 1 is a flowchart illustrating a disturbance compensation steering control method according to the present disclosure.

Referring to FIG. 1, when a disturbance is not confirmed by a disturbance detection control (S10 and S11) while a vehicle is being driven, a disturbance compensation steering control method performs a power assist steering control (S20) for providing motor assist power having a driver steering assist effect based on a vehicle speed. Otherwise, when a condition is satisfied through a disturbance reduction compensation control (S30) on a confirmed disturbance, the disturbance compensation steering control method performs a disturbance compensation steering control (S40) for providing the motor assist power having a disturbance canceling effect together with a driver steering assist effect on the steering.

In an embodiment, the disturbance reduction compensation control (S30) applies one or more of a driving condition, a straight driving condition, and a steering intent condition to the confirmed disturbance as a compensation calculation condition. The disturbance reduction compensation control (S30) recognizes and compensates for the confirmed disturbance by comparing a value of a motor angle sensor with a value of a steering sensor. A disturbance steering assist value and a steering restoration value applied to the disturbance compensation steering control (S40) are calculated as a final compensation amount. Thus, a disadvantage that the power assist steering control (S20) is vulnerable to disturbance robustness due to motor power, to which only a steering intent of a driver is reflected, is solved.

Figure 2:
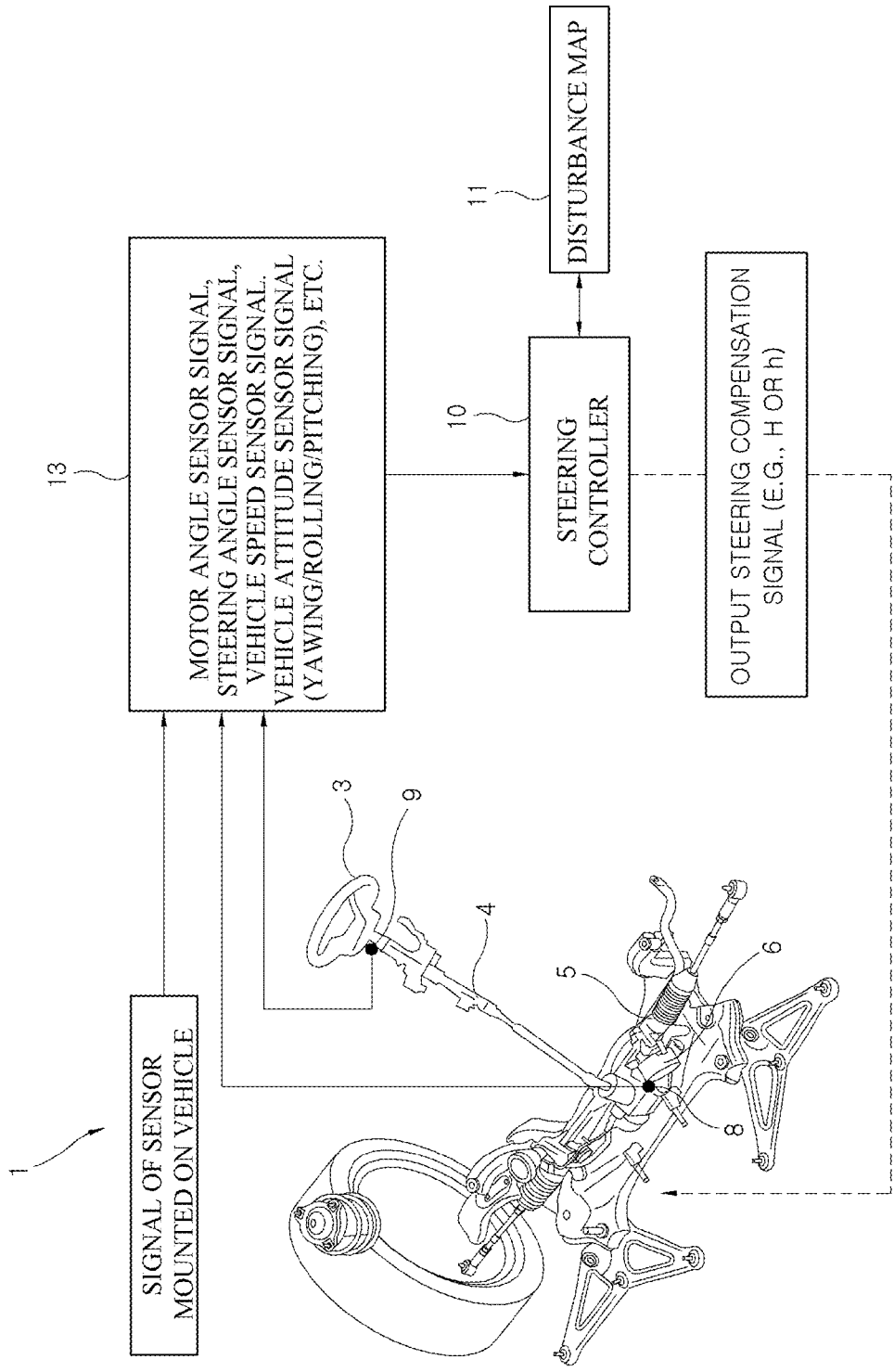
FIG. 2 is a diagram illustrating an embodiment of a motor driven power steering (MDPS) system implementing disturbance compensation steering control according to the present disclosure.

Referring to FIG. 2, a motor driven power steering (MDPS) system 1 includes a steering wheel 3, a steering column 4, a steering gear 5, and a steering motor 6 as basic components of a steering operation. The system further includes a motor angle sensor 8 and a steering angle sensor 9 as sensor components for disturbance recognition. The system further includes a steering controller 10 as a control component for disturbance calculation/compensation. Therefore, the MDPS system 1 is an MDPS system or an rack (R)-MDPS system.

Specifically, an operation of the driver is performed on the steering wheel 3. The steering column 4 delivers an operating force of the steering wheel 3 to the steering gear 5. The steering gear 5 boosts a steering operation according to a gear ratio to transmit the boosted steering operation to a vehicle wheel. The steering motor 6 assists a steering force of the driver with a steering torque of a motor according to a steering angle of the steering wheel 3. Consequently, the steering wheel 3, the steering column 4, the steering gear 5, and the steering motor 6 constitute basic hardware of the MDPS system 1.

Specifically, the motor angle sensor 8 is installed in the steering motor 6 at a position close to a tire and provides a large vibration to the steering controller 10 as strong disturbance information. The large vibration is introduced into the steering gear 5 from the tire to cause a variation in rotation angle of the steering motor 6. Meanwhile, the steering angle sensor 9 is installed in the steering wheel 3 connected to the steering column 4 and provides a small vibration to the steering controller 10 as weak disturbance information. The small vibration is delivered from the tire to the steering wheel 3 via the steering gear 5 and the steering column 4.

In an embodiment, a detected value of the motor angle sensor 8 is calculated as a motor-based steering angular velocity. A detected value of the steering angle sensor 9 is calculated as a steering angular velocity. Thus, the detected values are treated as different control factors respectively.

Specifically, the steering controller 10 operates as a central processing unit (CPU). A program or algorithm for the power assist steering control (S20), the disturbance reduction compensation control (S30), and the disturbance compensation steering control (S40) are stored in a memory. The steering controller 10 implements a logic processing of the program or algorithm. In an embodiment, the steering controller 10 includes a disturbance determination processor 10-1 and a disturbance compensation processor 10-2 and is described in detail with reference to FIG. 3.

To this end, the steering controller 10 is in connection with a disturbance map 11 and a data inputter 13. The disturbance map 11 includes an α (gain)-vehicle speed graph, an α (gain)-angular velocity difference (motor-based steering angular velocity-steering angular velocity) graph, and an a (gain)-steering torque graph as a map. The data inputter 13 detects a vehicle speed sensor signal and a vehicle attitude sensor signal (yawing/rolling/pitching) in addition to a motor angle sensor signal and a steering angle sensor signal as a vehicle mounted sensor. The data inputter 13 provides these signals to the steering controller 10 as input data.

Hereinafter, the disturbance compensation steering control method is described in detail with reference to FIGS. 2-4. In this case, a control main body is the steering controller 10 and a control target is the steering motor 6.

First, the steering controller 10 performs the disturbance detection control (S10 and S11) through detecting disturbance information according to the driving of the vehicle in S10 and the determined disturbance in S11.

Referring to FIG. 2, the steering controller 10 confirms a vehicle speed, a motor angle, and a steering angle of the data inputter 13 as input data to perform the detection of the disturbance information according to the driving of the vehicle (S10). In this case, the input data may include yawing, rolling, pitching, and the like so as to divide a driving road into a general road and a circuit (a circular race course).

In an embodiment, because a disturbance transfer path (see FIG. 4) is input first from a tire, an angular velocity of the motor angle sensor 8 of the MDPS system (e.g. an MDPS or an R-MDPS) connected to the tire is varied first. After a short time in the above process elapses, an input varies an angular velocity of the steering angle sensor 9 located at the steering wheel 3. However, because the driver is holding the steering wheel 3 by hands, a variation in the steering angular velocity of the steering angle sensor 9 is small. Therefore, when a steering angular velocity reflecting the motor angle sensor 8 located adjacent to the tire exceeds a range of the steering angular velocity value of the steering angle sensor 9 reflecting whether the driver has a steering intent for changing a vehicle direction, a disturbance is determined as being input.

Based on the determination result, the steering controller 10 applies the following disturbance determination condition to the determination of the disturbance (S11).

Disturbance determination condition: $|F|<f$? and $|H|>h$?

Here, "$|F|$" is an absolute value of the steering angular velocity calculated from the steering angle sensor 9. "f" is a steering angular velocity threshold and about 2 deg/s is applied thereto. "$|H|$" is an absolute value of a motor-based steering angular velocity calculated from motor angle sensor 8. "h" is a motor-based steering angular velocity threshold and about $1+\alpha$ (gain) deg/s is applied thereto. "<" and ">" are inequality signs indicating a magnitude relationship between two values.

In an embodiment, the α (gain) is set as a tuning parameter, which is variable according to the vehicle speed. Thus, the vehicle speed may be involved in the determination of the disturbance (S11). This is because, in the α (gain)-vehicle speed graph, the α (gain) indicates that the motor-based steering angular velocity of the motor angle sensor 8 increases with the vehicle speed.

As a result, when any one condition of $|F|<f$ and $|H|>h$ is not satisfied in the determination of the disturbance (S11), the steering controller 10 switches to the power assist steering control in S20.

Specifically, because the power assist steering control (S20) is a driving condition without an occurrence of disturbance, the power assist steering control (S20) performs a basic function of the steering to calculate a vehicle speed steering assist value and a steering restoration value, respectively, through a calculation of a vehicle speed compensation amount without consideration of a disturbance effect.

Figure 3:
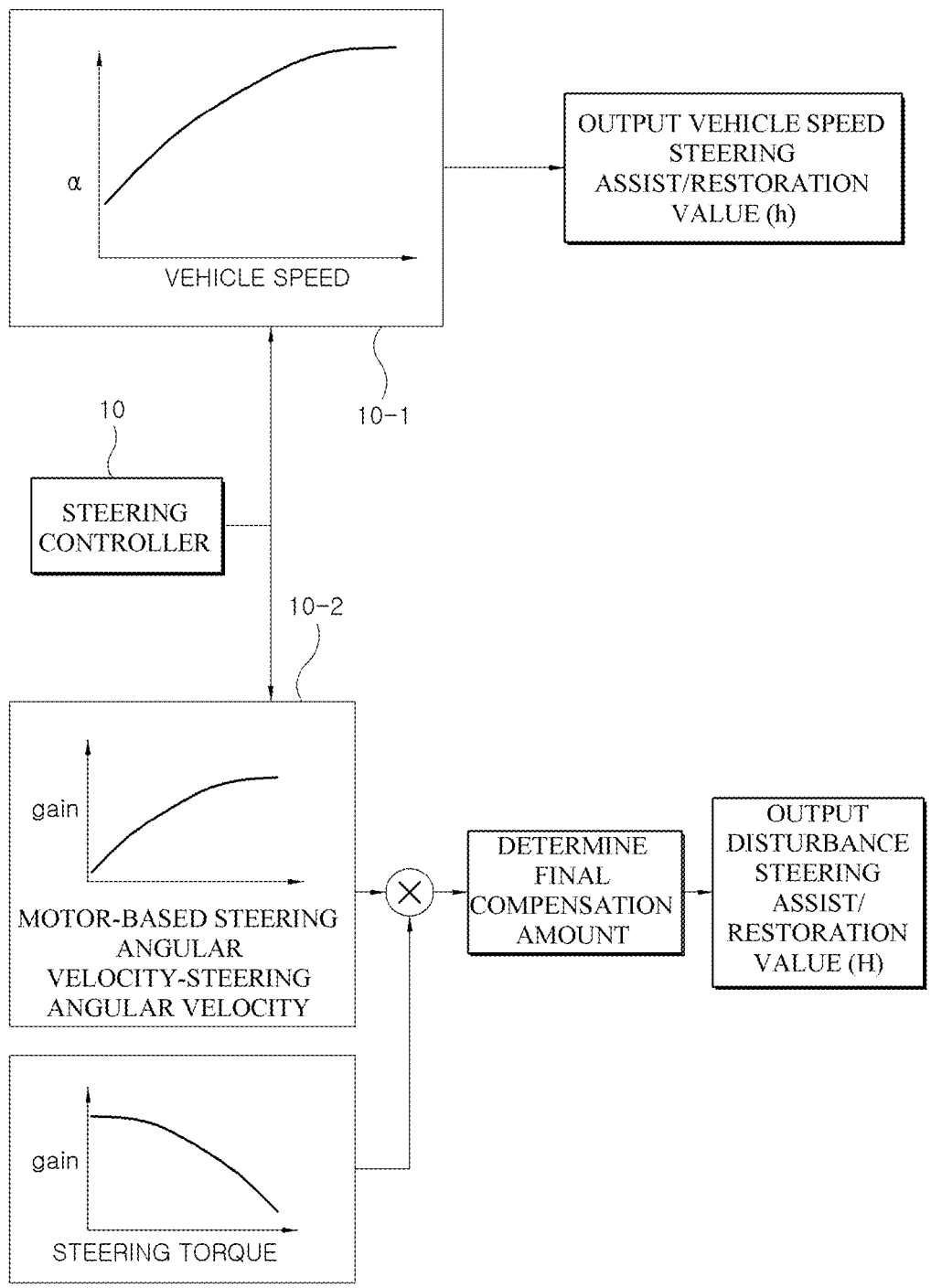
FIG. 3 is a diagram illustrating an embodiment of a disturbance determination processing procedure and a disturbance compensation processing procedure of a steering controller according to the present disclosure.

Referring to FIG. 3, the steering controller 10 generates a motor steering output h, which has a vehicle speed steering assist/restoration value in the disturbance determination processor 10-1 in conjunction with the α (gain)-vehicle speed graph of the disturbance map 11. The steering controller 10 compensates for even a small variation of the motor steering output h together with a large variation thereof at a low speed while compensating for only a large variation of the motor steering output h at a high speed. Thus, a steering sensitivity is adjusted according to the vehicle speed.

As described above, when the disturbance is not detected, the power assist steering control (S20) controls the steering sensitivity according to the high speed and the low speed with a vehicle speed compensation amount calculated by matching a gain to the vehicle speed. Further, when a calculation condition of the final compensation amount for the disturbance reduction compensation control (S30) is not satisfied, the power assist steering control (S20) transmits the vehicle speed compensation amount, which is calculated according to the vehicle speed, to the steering motor 6 as the motor steering output h.

Referring to FIG. 1 again, when all of $|F|<f$ and $|H|>h$ are satisfied in the determination of the disturbance (S11), the steering controller 10 switches to the disturbance reduction compensation control in S30.

Specifically, the steering controller 10 performs the disturbance reduction compensation control (S30) through executing a disturbance confirmation in S31, determining a disturbance compensation condition according to the disturbance detection in S32 to S34, determining the disturbance in S35, and calculating a disturbance compensation in S36.

For example, the execution of the disturbance confirmation (S31) indicates that the vehicle currently satisfies $|F|<f$ and $|H|>h$ simultaneously. The determination of the disturbance compensation condition according to the disturbance detection (S32 to S34) is divided into determining a driving state condition establishment in S32, determining a straight driving condition establishment in S33, and determining a steering intent condition establishment in S34.

Specifically, the determination of the driving state condition establishment (S32) is performed by confirming a driving state condition. The determination of the straight driving condition establishment (S33) is performed by confirming a straight driving condition. The determination of the steering intent condition establishment (S34) is performed by confirming a steering intent condition.

Driving state condition: driving mode≠circuit mode

Straight driving condition: $|A|<a$?

Steering intent condition: $|B|<b$?

Here, the "driving mode" is a classification with respect to a driving road, on which the vehicle is driving The "circuit mode" means driving in a circuit, such as a circular race course, in which variations in yawing/rolling/pitching are relatively large when compared to a general road. "$|A|$" is an absolute value of a steering angle detected by the steering angle sensor 9. "a" is a steering angle threshold and about ±3 deg is applied thereto. "$|B|$" is an absolute value of a steering torque detected by a torque sensor (a basic sensor not shown in the drawings but embedded in the steering column 4). "b" is the steering torque threshold and about 0.5 Nm is applied thereto. "≠, and >" are inequality signs indicating a magnitude relationship between two values.

Therefore, the circuit mode being applied in the determination of the driving state condition establishment (S32) may distinguish a general road driving, in which a disturbance effect should be compensate for, from a circuit driving (the driving mode is the circuit), in which the disturbance effect should not be reflected so as to maximize feedback of the driver. The steering angle being applied in the determination of the straight driving condition establishment (S33) may be divided into a steering angle magnitude in which the disturbance effect should be compensates for and a steering angle magnitude in which the disturbance effect is not necessary to be compensated for. The steering torque being applied in the determination of the steering intent condition establishment (S34) may be divided into an absence of a steering intent of the driver, in which the disturbance effect should be compensated for and a presence of the steering intent of the driver, in which the disturbance effect is not necessary to be compensated for.

As a result, when any one of "driving mode circuit mode," "$|A|<a$," and "$|B|<b$" is not satisfied, the steering controller 10 switches to the power assist steering control in S20.

Otherwise, when all of "driving mode≠circuit mode," "$|A|<a$," and "$|B|<b$" are satisfied, the steering controller 10 performs the determination of the disturbance (S35) to execute the calculation of the disturbance compensation (S36).

For example, the calculation of the disturbance compensation (S36) calculates the final compensation amount to calculate a disturbance steering assist value and a steering restoration value, which are capable of decreasing or reducing and removing the disturbance effect.

Referring to FIG. 3, the steering controller 10 calculates a steering angular velocity compensation amount according to the absolute value $|A|$ of the steering angle and a steering torque compensation amount according to the absolute value $|B|$ of the steering torque in the disturbance compensation processor 10-2 respectively. The steering controller 10 then adds and calculates the compensation amounts as the final compensation amount.

For example, the calculation of the steering angular velocity compensation amount confirms the motor-based steering angular velocity of the motor angle sensor 8 and the steering angular velocity of the steering angle sensor 9. The velocities are detected in a condition in which the absolute value $|A|$ of the steering angle is smaller than ±3 deg (i.e. a disturbance determination state). Then, a value obtained by subtracting the steering angular velocity from the motor-based steering angular velocity is set as a current angular velocity difference. Thus, an angular velocity difference (i.e. a current angular velocity difference) is obtained by matching to a gain in a gain-angular velocity difference (motor-based steering angular velocity-steering angular velocity) graph of the disturbance map 11. In this case, owing to a characteristic of the gain-angular velocity difference graph, the steering angular velocity compensation amount increases as the disturbance increases.

For example, the calculation of the steering torque compensation amount confirms the steering torque as a current steering torque. The steering torque is detected from the torque sensor (not shown) of the motor driven power steering system 1 in a condition in which the absolute value $|B|$ of the steering torque is smaller than 0.5 Nm (i.e. in a state in which an intent of the driver is not present). The steering torque (i.e. the current steering torque) is obtained by matching to a gain in the α (gain)-steering torque graph of the disturbance map 11. In this case, owing to a characteristic of the α (gain)-steering torque graph, when the intent of the driver is present, the steering torque compensation amount is reduced.

Figure 4:
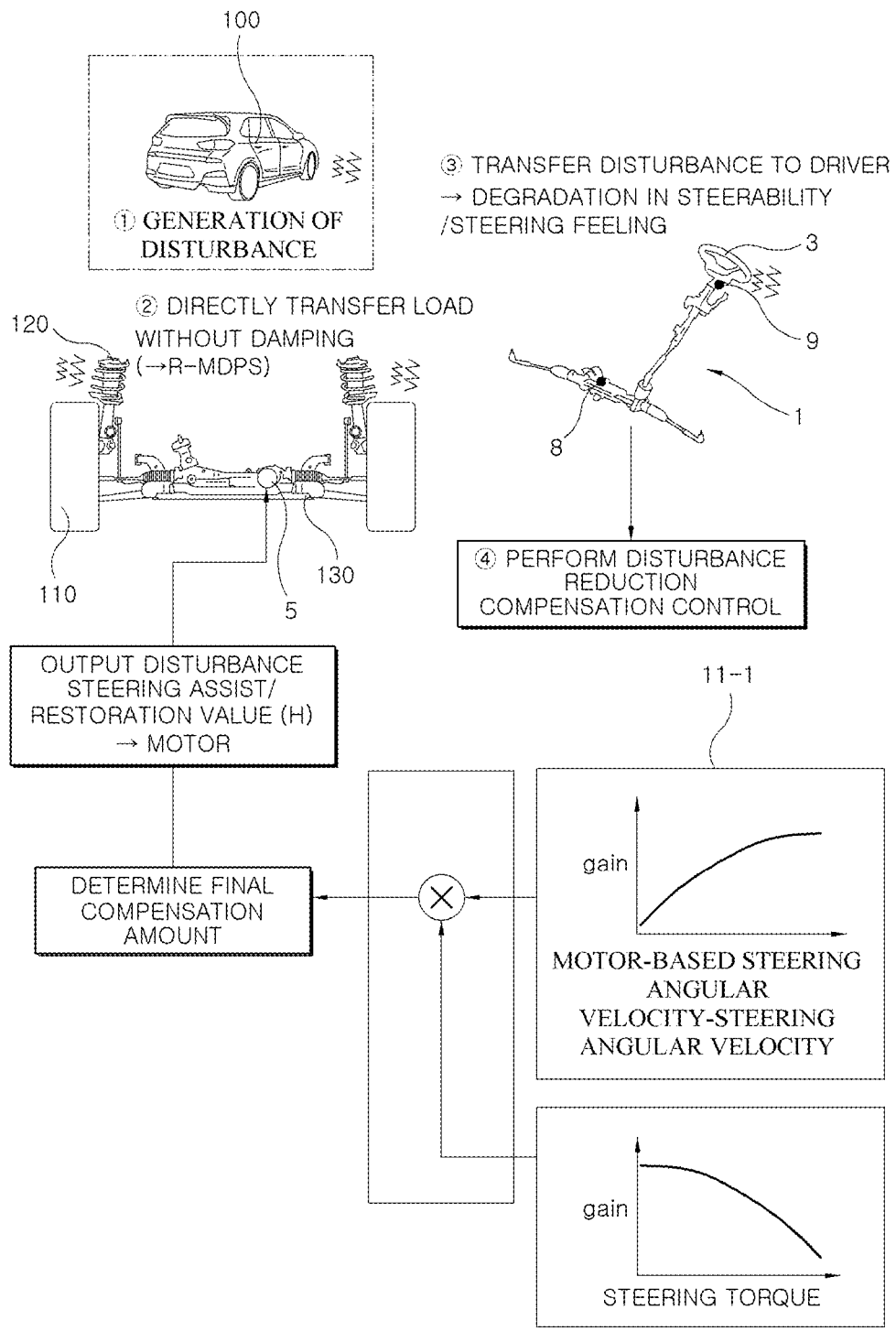
FIG. 4 is a diagram illustrating an operating state, in which an MDPS system applied to a high-performance vehicle performs a disturbance reduction compensation control on a disturbance with a final compensation amount of a steering controller according to the present disclosure.

FIG. 4 illustrates an example of the high-performance vehicle 100, to which the disturbance compensation steering control (S40) is applied by setting the final compensation amount of the disturbance reduction compensation control (S30) as a disturbance compensation steering output H with respect to the steering motor 6.

For example, the high-performance vehicle 100 includes the MDPS system 1, to which a high gear ratio steering gear is applied to have excellent responsiveness but which receives great influence of disturbance. The high-performance vehicle 100 further includes a tire 110, which is a high grip type tire and is disadvantageous to NVH. The high-performance vehicle 100 further includes a shock absorber 120, which is a high damping force type absorber and is disadvantageous to NVH. The high-performance vehicle 100 further includes a sub-frame 130, to which a solid mounting connection between the steering gear and a vehicle body is applied, in which a reinforcement is applied to the vehicle body, and which is disadvantageous to NVH. In this case, the MDPS system 1 is an MDPS system or an R-MDPS system.

Therefore, when the high-performance vehicle 100 is driven on a general road (i.e. driving on roads except for a circuit), ① a disturbance is generated→② a load is directly transferred from the tire 110 to the sub-frame 130 without damping→③ the disturbance is transferred to the driver via the MDPS system 1. Thus, a degradation of the steerability/ steering feeling is inevitably generated. Here, "→" means a time progress for an operation sequence.

However, the steering controller 10 applies the final compensation amount of the disturbance reduction compensation control (S30) to the disturbance compensation steering control (S40). The disturbance reduction compensation control (S30) is performed based on the vibration detection according to the disturbance of the motor angle sensor 8/the steering angle sensor 9 of the MDPS system 1 (see FIG. 2). The disturbance compensation steering control (S40) transmits the disturbance compensation steering output H to the steering motor 6 such that the steering motor 6 is driven with the final compensation amount.

As a result, the disturbance effect is decreased or reduced and removed in the MDPS system 1. Thus, even under the occurrence of the disturbance, the disturbance robustness and the NVH performance of the high-performance vehicle 100 may be significantly improved to implement the following features.

First, the disturbance robustness and the NVH performance may be significantly improved with respect to a high-performance vehicle, which is basically disadvantageous to NVH due to a vehicle characteristic according to high gear ratio steering, a high grip tire, and a high rigidity suspension/steering mounting/setting. The disturbance robustness and the NVH performance may be significantly improved with respect to an ordinary vehicle having a tendency, to which a high gear ratio and an increase of a tire width are applied. Second, the recognition/compensation for the disturbance is performed through a comparison between the value of the motor angle sensor and the value of the steering angle sensor. Thus, a steering stability (e.g. kickback) and a steering feeling (e.g. a steering wheel vibration and the like) may be improved in the MDPS system and the R-MDPS system. Third, a U-joint rubber coupling may be omitted. The U-joint rubber coupling is configured to improve an NVH characteristic of a vehicle, to which the MDPS system and the R-MDPS system is applied. Thus, the production cost competitiveness may be significantly improved.

As described above, in the disturbance compensation steering control method applied to the MDPS system 1 according to the present embodiment, the disturbance transferred from the tire 110 to the steering wheel 3 during the driving is detected by the steering controller 10. When the disturbance is detected, the final compensation amount calculated according to the disturbance strength and the magnitude of the steering torque is transmitted to the steering motor 6 as the disturbance compensation steering output H. Thus, the occurrence of disturbance during the driving is compensated for by the driving of the steering motor in a direction opposite to a vibration direction to provide a stable steering feeing to the driver. In an embodiment, the final compensation amount is calculated by considering even the vibration strength decreased from the tire toward the steering wheel due to the difference in the steering angular velocity between the motor angle sensor and the steering angle sensor. Thus, the disturbance robustness and the NVH performance may be significantly improved not only in the high-performance vehicle, but also in the ordinary vehicle having a high-performance tendency.

A disturbance compensation steering control applied to an MDPS system of the present disclosure implements the following actions and effects.

First, an MDPS disturbance compensation logic including a vibration, which is continuously transferred during the driving, as a control target, is implemented. Thus, the disturbance robustness and the NVH performance can be significantly improved in a high-performance vehicle. A high gear ratio steering, a high grip tire, and a high rigid suspension/steering mounting/setting are applied to the high-performance vehicle. Second, owing to the improvement of the NVH performance, a U-joint rubber coupling configured to improve an NVH characteristic of the MDPS system is omitted. Thus, the reduction in the production cost can be achieved. Third, a minute vibration felt by hands is prevented using the motor angle sensor at the tire and the steering angle sensor at the steering wheel. Thus, the steering stability of the vehicle (such as a kickback applying a mechanical impact load and the like) and steering feeling (such as a steering wheel vibration and the like) can be significantly improved. Fourth, owing to the improvement of the disturbance robustness with respect to not only the MDPS system but also the R-MDPS system, the quality improvement of the MDPS system can be achieved. Fifth, instead of applying a bushing mounting and a low rigidity (i.e. a rigidity reduction) connection, the requirements for high gear ratio/tire width increases, which are required for an ordinary vehicle, are satisfied. Thus, the requirements can be easily applied to an ordinary vehicle having a high-performance tendency even without developing a separate technique for improving the NVH performance in addition to the disturbance robustness.

While the present disclosure has been described with respect to the specific embodiments, it should be apparent to those having ordinary skill in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A disturbance compensation steering control method, comprising:
   when a steering controller performs, during driving, a disturbance detection in which a tire and a steering wheel become a transfer path, performing a disturbance reduction compensation control by calculating a final compensation amount for a disturbance compensation steering output transmitted to a steering motor according to a disturbance strength and a magnitude of a steering torque,
   wherein a motor-based steering angular velocity through the steering motor and a steering angular velocity through the steering wheel are applied to the disturbance detection,
   wherein the motor-based steering angular velocity is calculated by matching a gain to a vehicle speed, and
   wherein the gain is set as a tuning parameter, which is variable according to the vehicle speed increased with the motor-based steering angular velocity calculated from a motor angle sensor.

2. The disturbance compensation steering control method of claim 1, wherein, when the steering angular velocity is smaller than a threshold and the motor-based steering angular velocity is larger than the threshold, the disturbance detection is determined.

3. The disturbance compensation steering control method of claim 1, wherein the disturbance reduction compensation control includes:

determining a disturbance compensation condition according to the disturbance detection;

confirming a disturbance with the disturbance compensation condition; and calculating the final compensation amount according to the disturbance strength and the magnitude of the steering torque.

4. The disturbance compensation steering control method of claim 3, wherein the determination of the disturbance compensation condition includes:

determining whether a vehicle driving mode is general road driving;

determining whether a vehicle driving is in a straight driving state; and determining whether a steering intent of a driver is present.

5. The disturbance compensation steering control method of claim 4, wherein the vehicle driving mode excludes a circuit mode.

6. The disturbance compensation steering control method of claim 4, wherein the straight driving state is determined based on a steering angle according to an operation of the steering wheel.

7. The disturbance compensation steering control method of claim 6, wherein the steering angle is applied as an absolute value of the steering angle and the absolute value of the steering angle is smaller than a threshold.

8. The disturbance compensation steering control method of claim 7, wherein the threshold of the absolute value of the steering angle is ±3 deg.

9. The disturbance compensation steering control method of claim 4, wherein the steering intent of the driver is determined by the steering torque according to an operation of the steering wheel.

10. The disturbance compensation steering control method of claim 9, wherein the steering torque is applied as an absolute value of the steering torque and the absolute value of the steering angle is smaller than a threshold.

11. The disturbance compensation steering control method of claim 10, wherein the threshold of the absolute value of the steering torque is 0.5 Nm.

12. The disturbance compensation steering control method of claim 3, wherein the final compensation amount is increased as the disturbance strength is increased and the magnitude of the steering torque is decreased.

13. The disturbance compensation steering control method of claim 12, wherein the final compensation amount is calculated by combining the disturbance strength with the magnitude of the steering torque.

14. The disturbance compensation steering control method of claim 13, wherein:

the disturbance strength is calculated as a steering angular velocity compensation amount; and the steering angular velocity compensation amount is calculated by matching a gain to a difference in an angular velocity obtained by subtracting the steering angular velocity through the steering wheel from the motor-based steering angular velocity through the steering motor.

15. The disturbance compensation steering control method of claim 13, wherein:

the magnitude of the steering torque is calculated with a steering torque compensation amount; and the steering torque compensation amount is calculated by matching a gain to the steering torque.

16. The disturbance compensation steering control method of claim 1, wherein:

when in a driving state in which the disturbance detection is not present or a calculation condition of the final compensation amount is not satisfied, the steering controller switches to power assist steering control; and the power assist steering control controls a steering sensitivity according to a high speed and a low speed with a vehicle speed compensation amount calculated by matching the gain to the vehicle speed.

* * * * *